US012058097B2

(12) United States Patent
Daviss

(10) Patent No.: US 12,058,097 B2
(45) Date of Patent: Aug. 6, 2024

(54) TECHNIQUES FOR PERFORMING DOMAIN NAME SYSTEM SUPPORT

(71) Applicant: Cisco Technology, Inc., San Jose, CA (US)

(72) Inventor: Jeffery Rodd Daviss, Port Coquitlam (CA)

(73) Assignee: Cisco Technology, Inc., San Jose, CA (US)

( * ) Notice: Subject to any disclaimer, the term of this patent is extended or adjusted under 35 U.S.C. 154(b) by 143 days.

(21) Appl. No.: 17/464,966

(22) Filed: Sep. 2, 2021

(65) Prior Publication Data

US 2023/0062068 A1 Mar. 2, 2023

(51) Int. Cl.
*H04L 61/4511* (2022.01)
*H04L 61/10* (2022.01)
*H04L 101/686* (2022.01)

(52) U.S. Cl.
CPC .......... *H04L 61/4511* (2022.05); *H04L 61/10* (2013.01); *H04L 2101/686* (2022.05)

(58) Field of Classification Search
CPC .............................. H04L 61/4511; H04L 61/10
USPC ........................................................ 709/245
See application file for complete search history.

(56) References Cited

U.S. PATENT DOCUMENTS

| 7,277,453 | B2* | 10/2007 | Chin ................... H04L 61/4511 370/395.5 |
| 9,712,485 | B2* | 7/2017 | Droms ..................... H04L 41/12 |
| 9,838,259 | B1* | 12/2017 | Earnhart ............. H04L 61/4511 |
| 10,057,208 | B2* | 8/2018 | Droms ................ H04L 61/4511 |
| 10,404,827 | B2* | 9/2019 | Evens ..................... H04L 67/51 |
| 2005/0267978 | A1* | 12/2005 | Satapati ............. H04L 61/2585 709/230 |
| 2011/0292857 | A1* | 12/2011 | Sarikaya ............. H04W 80/045 370/312 |

(Continued)

FOREIGN PATENT DOCUMENTS

FR 3023098 A1 1/2016

OTHER PUBLICATIONS

Bagnulo, Marcelo & Alberto, Garcia-Martinez & Beijnum, Iljitsch. (2012). The NAT64/DNS64 tool suite for IPv6 transition. IEEE Communications Magazine—IEEE Commun. Mag . . . 50. 177-183. 10.1109/MCOM.2012.6231295.

(Continued)

*Primary Examiner* — Tauqir Hussain
(74) *Attorney, Agent, or Firm* — Lee & Hayes, P.C.

(57) ABSTRACT

This disclosure describes techniques for performing domain name system (DNS) support on public resolvers. For instance, an electronic device may send a query to a local DNS resolver. The electronic device may then receive an answer from the local DNS resolver that includes a pattern. Using the answer, the electronic device may generate a DNS packet that includes at least the answer and a query for a first Internet Protocol (IP) address associated with a first IP version, such as IPv6. The electronic device may then send the DNS packet to a public DNS resolver. Using the DNS packet, the public DNS resolver may generate a synthesized IP address associated with the first IP version. For example, the public DNS resolver may identify a second IP address associated with a second IP version, such as IPv4, and generate the synthesized IP address using the second IP address and the answer.

21 Claims, 9 Drawing Sheets

(56) References Cited

U.S. PATENT DOCUMENTS

| | | | |
|---|---|---|---|
| 2013/0201999 A1* | 8/2013 | Savolainen | H04L 61/4511 370/467 |
| 2013/0301651 A1 | 11/2013 | Taddad | |
| 2014/0376470 A1 | 12/2014 | Mahkonen et al. | |
| 2015/0074221 A1 | 3/2015 | Kuparinen et al. | |
| 2016/0344688 A1* | 11/2016 | Lakhera | H04L 61/4511 |
| 2019/0297655 A1* | 9/2019 | Garneij | H04L 61/5007 |
| 2022/0311734 A1* | 9/2022 | Boucadair | H04L 61/4511 |
| 2023/0083671 A1* | 3/2023 | Qu | H04L 61/4511 |

OTHER PUBLICATIONS

Boucadair. Orange M: "An EDNS0 Option for Sharing Pref64: :/ndraft-boucadair-dnsop-prefix64-01; draft-boucadair-dnsop-prefix64-01.txt", An Edns0 Option for Sharing PREF64::/N DRAFT-BOUCADAIR-DNSOP-PREFIX64-01; DRAFT-BOUCADAIR-DNSOP-PREFIX64-01.TXT; Internet-Draft: Network Working Group, Internet Engineering Task Force, IETF; Standardw No. 1, Jun. 24, 2021, pp. 1-9, XP015146466, URL:https://tools.ietf.org/html/draft-boucadair-dnsop-prefix64-01 [retrieved on Jun. 24, 2021] abstract.

PCT Search Report and Written Opinion mailed Oct. 18, 2022 for PCT application No. PCT/ US2022/041729, 13 pages.

Savolainen Nokia J Korhonen Broadcom D Wing Cisco Systems T: "Discovery of the IPv6 Prefix Used for IPv6 Address Synthesis; rfc7050.txt", Discovery of the IPv6 Prefix Used for IPv6 Address Synthesis; RFC7050.TXT, Internet Engineering Task Force, IETF; Standard, Internet Society (ISOC) 4, Rue Des Falaises CH—1205 Geneva, Switzerland, Nov. 6, 2013 (Nov. 6, 2013), pp. 1-22, XP015094929, [retrieved on Nov. 6, 2013] abstract, paragraph [0003].

\* cited by examiner

US 12,058,097 B2

TECHNIQUES FOR PERFORMING DOMAIN NAME SYSTEM SUPPORT

TECHNICAL FIELD

The present disclosure relates generally to optimizing domain name lookups on public DNS servers (resolvers) by leveraging information provided by the DNS client which is making the lookup request when IPv4-to-IPv6 network address translation is required.

BACKGROUND

A Domain Name System (DNS) resolver works with an IP address translator, such as a network address translation 6-to-4 (NAT64) gateway, in order to enable client-server communication between a client on a local Internet Protocol version 6 (IPv6) network and a server on an Internet Protocol version 4 (IPv4) external network using a technology called DNS64. For instance, a local DNS resolver (that is, a DNS resolver on the private network) which is DNS64-enabled may use a network prefix (the prefix) that is configured for the translator, where the prefix is configured by a network administrator of the local network. To implement a DNS lookup, the local DNS resolver adds the prefix to the IPv4 address associated with the IPv4 server to generate a synthetic IPv6 address. This address is then used by the IPv6 client to access the IPv4 server via the translator. However, since the prefix is associated with the local network, an external DNS resolver (henceforth the public DNS resolver) that is not included in the local network is unable to generate the synthetic IPv6 address from the IPv4 address, leaving the public DNS resolver unable to service name lookups where IPv4-to-IPv6 network address translation is required.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1A:
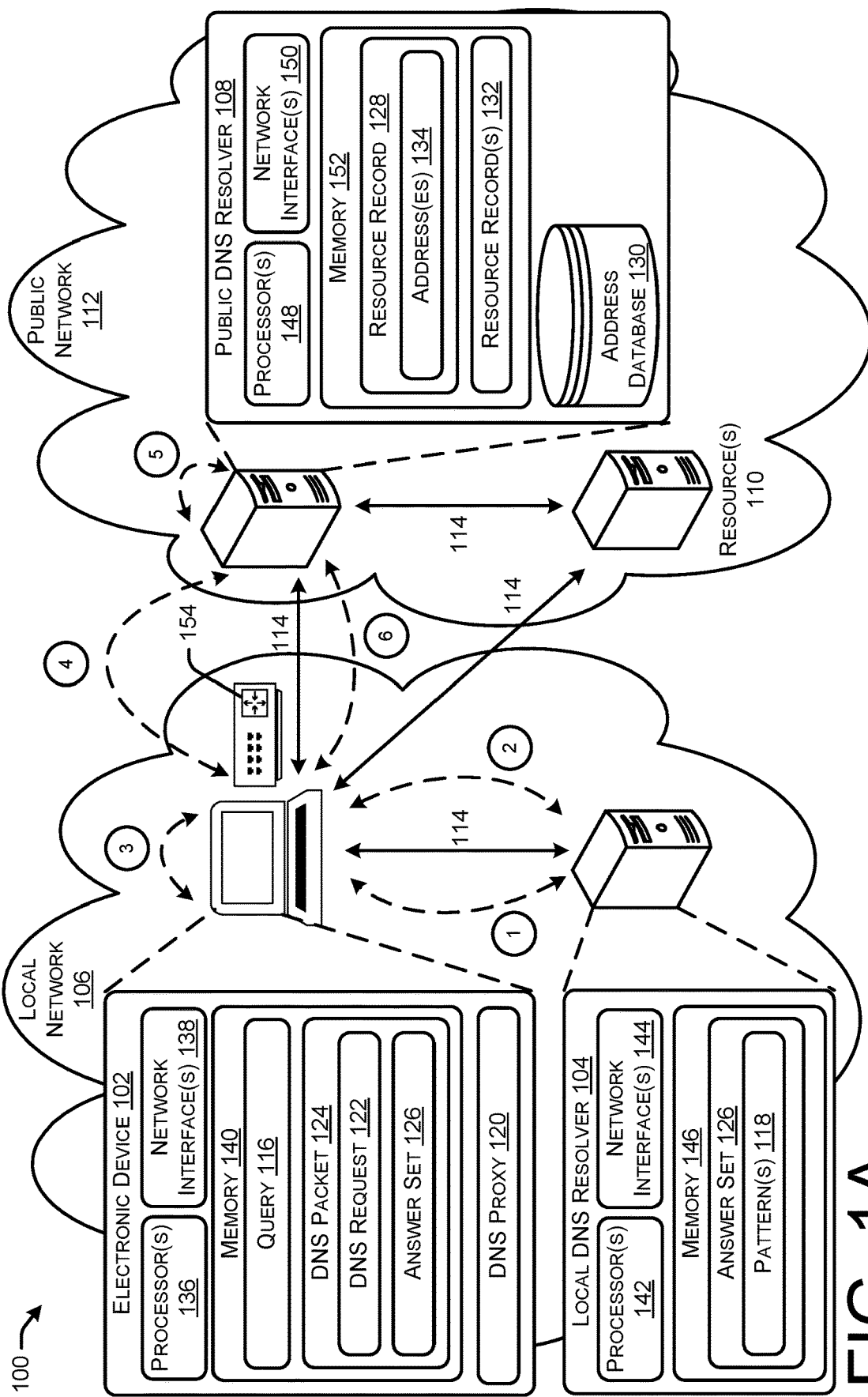
FIG. 1A illustrates a component diagram with an example environment in which Domain Name System support may be provided, in accordance with the present concepts.

This disclosure describes, at least in part, an electronic device that is configured to determine a pattern associated with a first Internet Protocol (IP) version. The electronic device is also configured to generate a Domain Name System (DNS) packet, the DNS packet including at least the pattern and a query for an IP address associated with a resource, the IP address associated with a second IP version. Furthermore, the electronic device is configured to send the DNS packet to a DNS resolver.

This disclosure also describes, at least in part, a method that includes determining a pattern associated with a first Internet Protocol (IP) version. The method additionally includes generating a Domain Name System (DNS) packet, the DNS packet including at least the pattern and a query for an IP address associated with a resource, the IP address being associated with a second IP version. Furthermore, the method includes sending the DNS packet to a DNS resolver.

This disclosure further describes, at least in part, a system that is configured to receive, from an electronic device, a Doman Name System (DNS) packet, the DNS packet including at least a pattern and a query for a first Internet Protocol (IP) address associated with a resource, the first IP address being associated with a first IP version. The system is additionally configured to determine a second IP address that is associated with the resource, the second IP address associated with a second IP version. Furthermore, the system is configured to generate a synthesized IP address based at least in part on the second IP address and the pattern, the synthesized IP address being associated with the first IP version Example Embodiments This disclosure describes, at least in part, techniques for performing Domain Name System (DNS) support on public resolvers. For instance, an electronic device may be connected to a first network (e.g., a local area network) that uses a first Internet Protocol (IP) version, such as IP version 6 (IPv6). The electronic device may attempt to communicate with a resource that is connected to a second network (e.g., a wide area network) and that uses a second IP version, such as IP version 4 (IPv4) or IPv4/IPv6 dual-stack. To communicate, the electronic device may communicate with a first DNS resolver (e.g., a local DNS resolver), which is part of the first network, to retrieve an answer that includes a at least one pattern associated with a local translator, such as a network address translation 6-to-4 (NAT64) gateway. The electronic device may then generate a DNS packet (e.g., an enhanced DNS packet) that includes at least the answer containing the pattern(s) and a query for the IPv6 address associated with the resource. After generating the DNS packet, the electronic device may send the DNS packet to a second DNS resolver (e.g., a public DNS resolver). Using the DNS packet, the second DNS resolver may retrieve an IPv4 address associated with the resource and then use the answer containing the pattern(s), from the DNS packet, to generate at least one synthesized IP address. The second DNS resolver may then send the synthesized IP address(es) back to the electronic device. In some examples, using the synthesized IP address(es), the electronic device is then able to communicate with the resource.

For more detail, the electronic device, which is again communicating using the first network, may attempt to communicate with the resource, which is again communicating using the second network. As described herein, the electronic device may include, but is not limited to, a mobile phone, a computer, a laptop, a DNS resolver, and/or any other type of device. Additionally, the resource may include, but is not limited to, a device, a system, a server, a node, and/or any other type of network resource. To communicate with the resource, the electronic device (e.g., a web browser executing on the electronic device) may generate a DNS request (referred to, in these examples, as a "first DNS request") that includes a query for an IP address (referred to, in these examples, as a "first IP address") associated with the first IP version. For example, the query may include an AAAA query for an IPv6 address associated with the resource. In some examples, the electronic device then sends the first DNS request to the first DNS resolver, which is configured to generate synthesized resource records.

For example, the first DNS resolver may initially search for a resource record (referred to, in these examples, as a "first resource record") associated with the first IP version (e.g., an AAAA resource record). Since the resource is communicating using the second IP version, the first DNS resolver may determine that the first resource record is unavailable. As such, the first DNS resolver may send, to the electronic device, a DNS response (referred to, in these examples, as a "first DNS response") that includes an empty answer. Based on receiving the first DNS response, the electronic device may then generate another DNS request (e.g., referred to, in these examples, as a "second DNS request") that includes query for an additional address (referred to, in these examples, as a "second address") associated with the second IP version. For example, this query may include an A query for an IPv4 address associated with the resource. The electronic device may then send the second DNS request to the first DNS resolver.

Based on receiving the second DNS request, the first DNS resolver may then search for a resource record (referred to, in these examples, as a "second resource record") associated with the second IP version (e.g., an A resource record), where the second resource record includes an IP address (referred to, in these examples, as a "second IP address") associated with the resource (e.g., an IPv4 address associated with the resource). In response to identifying the second resource record, the first DNS resolver then generates a synthesized resource record using the second resource record and information associated with the first network. For example, the first DNS resolver may generate a synthesized AAAA resource record by adding at least a prefix and/or a suffix associated with the local area network to an IPv4 address contained in the second resource record. The first DNS resolver may then send a DNS response (referred to, in these examples, as a "second DNS response") that includes the synthesized resource record to the electronic device.

Using the synthesized IP address(es) contained in the synthesized resource record, the electronic device is then able to communicate with the resource via the local translator.

Additionally, the electronic device (e.g., a DNS proxy that intercepts the first DNS request) may send a DNS packet that includes at least the first DNS request to the second DNS resolver. In some examples, the second DNS resolver may use the DNS packet to perform one or more checks, such as one or more security checks, associated with the resource (e.g., determine whether the resource is malicious, determine whether the resource is associated with a phishing scam, etc.). In order to perform the one or more security checks, the second DNS resolver may need the synthesized IP address(es) associated with the resource. However, since the prefix and/or the suffix may be specific to the first network for which the electronic device is communicating, the second DNS resolver may be unable to perform similar processes as those describe above with respect to the first DNS resolver in order to generate the synthesized IP address(es). This is because, unlike the first DNS resolver, the second DNS resolver may not have any knowledge of the prefix and/or the suffix since it is not part of the internal network. As such, the electronic device may initially enhance the DNS packet that is sent to the second DNS resolver so that the second DNS resolver may use the data added to the DNS packet, as enhanced, to generate the synthesized IP address(es).

To enhance the DNS packet, the electronic device may initially send a query to the first DNS resolver (and/or any other DNS resolver that is associated with the first network) for an IP address (referred to, in these examples, as a "third IP address") that is associated with the first network. In some examples, the query includes a DNS query for the third IP address (e.g., the IPv6 address) of the name ipv4only.arpa. The first DNS resolver (and/or the other DNS resolver(s)) may then send, to the electronic device, an answer (e.g., an AAAA answer) that includes the third IP address. In some examples, the third IP address may include an IPv6 address with a prefix and a suffix associated with the first network, which are associated with a "pattern," and an IP address (referred to, in these examples, as a "fourth IP address") associated with the second network (e.g., a well-known IPv4 address, such as, but not limited to, 192.0.0.170, 192.0.0.171, and/or any other well-known address). In some examples, the electronic device may receive more than one answer from the local DNS resolver(s), where the answer(s) include more than one IP address (e.g., a first answer that uses 192.0.0.170 and a second answer that uses 192.0.0.171).

While this is just one example of how the electronic device may determine the pattern(s), in other examples, the electronic device may use additional and/or alternative techniques to determine the pattern(s). For example, such as when the electronic device includes a DNS resolver (described in more detail below), the pattern(s) may be configured by the network administrator in the DNS resolver. In any of the examples herein, the electronic device (e.g., the DNS proxy) may then enhance the DNS packet using the pattern(s).

For a first example, the electronic device (and/or the DNS proxy) may embed the pattern(s) in the OPT_RR portion of the DNS packet. In some examples, a new Internet Assigned Numbers Authority (IANA) code may be registered and created, where the electronic device (and/or the DNS proxy) embeds the pattern(s) using the new IANA code. In some examples, the electronic device (and/or the DNS proxy) embeds the pattern(s) using existing code associated with the OPT_RR portion of the DNS packet. Still, in other examples, the electronic device (and/or the DNS proxy) may send, along with the DNS packet and/or the first DNS query, additional resource records in the enhanced DNS packet that includes the pattern(s) (in this case, a new resource record type would have to be defined and standardized to carry the prefix data). In other words, the DNS packet that is sent by the electronic device (and/or the DNS proxy) may be enhanced either by adding additional and/or resource records that include the pattern(s) to the DNS packet, or by adding the pattern(s) to the body of an OPT_RR resource record which then gets added to the DNS packet.

After enhancing the DNS packet, the electronic device may send the DNS packet to the second DNS resolver. The second DNS resolver may then perform some of the processes described above, with respect to the first DNS resolver, in order to generate the synthesized resource record. For example, the second DNS resolver may initially search for the first resource record associated with the first IP version (e.g., an AAAA resource record). Again, since the resource is communicating using the second IP version, the second DNS resolver may determine that the first resource record is unavailable. The second DNS resolver may then analyze the DNS packet to determine that the DNS packet includes the pattern(s) (e.g., determine that the DNS packet is enhanced with the answer that includes the pattern(s)). Based on the determination, the second DNS resolver may then search for the second resource record associated with the second IP version (e.g., an A resource record). Based on identifying the second resource record, the second DNS resolver then generates the synthesized resource record (e.g., a synthesized AAAA resource record) using the pattern(s) and the second resource record.

For instance, such as when the DNS packet includes the pattern(s), the second DNS resolver may analyze the pattern(s) in order to identify the prefix and/or the suffix associated with the pattern(s) for the first network. For example, the second DNS resolver may determine where the well-know IPv4 address starts by performing pattern(s) matching. Once the second DNS resolver identifies the well-known IPv4 address, the second DNS resolver may determine that anything before the well-known IPv4 address defines the prefix and anything after the well-known IPv4 address defines the suffix. The second DNS resolver may then generate a synthesized AAA resource record by adding at least the prefix and/or the suffix associated with the first network to an IPv4 address contained in the second resource record. While this is just one example technique of how the second DNS resolver may generate the synthesized resource record, in other examples, the second DNS resolver may perform additional and/or alternative techniques.

In some examples, the second DNS resolver may then use the synthesized resource record in order to perform the one or more security checks. Additionally, in some examples, the second DNS resolver may send a DNS response (referred to, in these examples, as a "third DNS response") that includes the synthesized resource record to the electronic device.

The examples above describe the electronic device enhancing the DNS packet in order to perform a "forward lookup" for an address associated with a first IP version (e.g., IPv6 address) to a resource associated with a second IP version (e.g., an IPv4 resource). In other words, the examples describe mapping a name to an address. However, in other examples, the devices may perform similar DNS packet enhancing processes in order to perform a "reverse lookup" that maps an address to one or more names. For example, the electronic device may generate a DNS packet that includes the pattern(s) (which may be determined using one or more of the processes described herein) and a query (e.g., a PTR query) for an address associated with the first version (IPv6 address). In some examples, the electronic device may use similar processes as those described above in order to embed the pattern(s) in the DNS packet when enhancing the DNS packet. The electronic device may then send the DNS packet to the second DNS resolver.

The second DNS resolver will receive the DNS packet that is enhanced with the pattern(s) by the electronic device. The second DNS resolver then takes an IP address (referred to, in these examples, as a "third IP address) (which may include an IPv6 address and be similar to the synthesized address(es) described above) that is included in the query and determines that the third IP address does not exist. Based on the determination, the second DSN resolver may then match the third IP address to the pattern(s) that are included in the DNS packet. Based on the match, the second DNS resolver then extracts an IP address (referred to, in these examples, as a "fourth IP address") (which may include an IPv4 address) from the third IP address using the pattern(s). In some examples, the second DNS resolver extracts the fourth IP address by removing at least the prefix and the suffix, associated with the pattern(s), from the third IP address. For example, if the third IP address includes an IPv6 address, then the second DNS resolver may extract an IPv4 address (e.g., the fourth IP address) from the IPv6 address using the pattern(s).

The second DNS resolver may then perform a search using the fourth IP address in order to identify data (e.g., name(s)) associated with the fourth IP address. In some examples, the second DSN resolver identifies the data through a different DNS resolver using the fourth IP address. Additionally, or alternatively, in some examples, the second DSN resolver identifies the data by performing a lookup, using the fourth IP address, in existing cached data. In either of the examples, the second DNS resolver may then send an answer that includes the data to the electronic device. In some examples, such as when the second DNS resolver includes an authoritative DNS resolver, and before sending the answer, the second DNS resolver may digitally sign the answer using a key (e.g., a private key). This way, the electronic device (and/or any intervening DNS resolver(s)) that sent the DNS packet to the second DNS resolver can verify the answer, such as by using DNS security extension (DNSSEC) protocols.

In some examples where the DNS packet is enhanced for "reverse lookup," the second DNS resolver may have to determine that the pattern(s) match the third IP address before generating the fourth IP address. In other words, if the pattern(s) do not match the third IP address, then the second DNS resolver may be unable to use the pattern(s) to generate the third IP address. This is because the pattern(s) may need to include the same prefix and suffix as added to create the third IP address in order for the second DNS resolver to later extract the fourth IP address from the third IP address using the pattern(s).

By performing the processes described herein, the second DNS resolver, which is on the second network, is able to generate the synthesized resource record instead of the electronic device (e.g., instead of the DNS proxy). In other words, the DNS64 support may be moved from the electronic device (and/or the local network) to the second DNS resolver (and/or the wide area network). Additionally, the processes described herein may reduce the amount of traffic that sent between the devices. For example, after determining that the first resource record is unavailable when performing the initial search for the first resource record, the second DNS resolver does not have to send the first DNS response to the electronic device and/or the electronic device does not have to send the second DNS request to the second DNS resolver. This, in addition to reducing the amount of network traffic required for address synthesis, may also reduce the time that it takes to perform DNS queries by the electronic device and/or the second DNS resolver since the data exchange between the two devices would require fewer interactions.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1A illustrates a component diagram with an example environment 100 in which DNS support may be provided, in accordance with the present concepts. The example environment 100 may include an electronic device 102 and a local DNS resolver 104 that use a local network 106 and a public DNS resolver 108 and resource(s) 110 that use a public network 112 (e.g., a wide area network). Parentheticals are utilized after a reference number to distinguish like elements. Use of the reference number without the associated parenthetical is generic to the element. Additionally, although the example of FIG. 1A illustrates the electronic device 102 as including a desktop computer, as well as the local DNS resolver 104, the public DNS resolver 108, and the resource(s) 110 as including systems, in other examples, the electronic device 102, the local DNS resolver 104, the public DNS resolver 108, and/or the resource(s) 110 may include any other type of device.

In some examples, the environment 100 comprises a data center or cloud-computing network comprising servers and other network components (e.g., routers, switches, etc.) stored across multiple data centers located across geographic areas. In these instances, the cloud-computing environment may be a distributed network through which devices interact with service provided by the cloud computing network. The cloud computing network may provide on-demand availability of computing system resources, such as data storage, computing power (e.g., CPU, GPU, etc.), networking, databases, DNS functionality, etc., without direct active management by users. In some examples, the cloud computing network may be managed and maintained by a service provider such that users do not have to invest in and maintain the computing infrastructure for their computing resource needs.

The electronic device 102, the local DNS resolver 104, the public DNS resolver 108, and/or the resource(s) 110 may be communicatively coupled among one another and/or to various other devices via the local network 106 and the public network 112. Within the example environment 100, the electronic device 102, the local DNS resolver 104, the public DNS resolver 108, the resource(s) 110, and/or any other device(s) may exchange communications (e.g., packets) via network connection(s), indicated by double arrows 114. For instance, network connections 114 may be transport control protocol (TCP) network connections or any network connection (e.g., information-centric networking (ICN)) that enables the devices to exchange packets with other devices via the local network 106 and/or the public network 112. The network connections 114 represent, for example, a data path between each of the electronic device 102, the local DNS resolver 104, the public DNS resolver 108, and/or the resource(s) 110.

For example, the electronic device 102 may be a computer, laptop, mobile device, tablet, etc., while the local DNS resolver 104 and/or the public DNS resolver 108 may be configured to provide data and/or network services, such as DNS services, to the electronic device 102. The electronic device 102 may or may not be a producer, a point of generation, and/or origination of the data. For instance, the data may originate elsewhere for the electronic device 102 to be able to provide the data to the local DNS resolver 104 and/or the public DNS resolver 108. Additionally, or alternatively, the data may pass through other network devices (e.g., NAT gateway, router, switch, etc.) on a path between the electronic device 102 and the local DNS resolver 104 and/or the public DNS resolver 108. It should be appreciated that the term "network connection" may also be referred to as a "network path." The use of a cloud computing network in this example is not meant to be limiting. Other types of networks are contemplated in accordance with the emergency notification concepts described herein.

At "Step 1," the electronic device 102 may send a query 116 to the local DNS resolver 104 for pattern(s) 118 associated with the local network 106. For instance, a DNS proxy 120 associated with the electronic device 102 may intercept a first DNS request 122, which may be generated and/or sent by a web browser of the electronic device 102. Based on intercepting the first DNS request 122, the DNS proxy 120 may determine to generate an enhance DNS packet 124 that includes at least the DNS request 122 and an answer set 126 (e.g., one or more answers) that includes at least the pattern(s) 118. As such, the DNS proxy 120 may cause the electronic device 102 to send the query 116 to the local DNS resolver 104. In some examples, the query 116 includes a DNS query for an address of the first IP address version (e.g., the IPv6 address) of the name ipv4only.arpa. However, in other examples, the query 116 may include any other type of query.

At "Step 2," the local DNS resolver 104 may then send the answer set 126 that includes the pattern(s) 118 to the electronic device 102. For instance, after receiving the query 116, the local DNS resolver 104 may determine the pattern(s) 118. In some examples, the pattern(s) 118 is associated the first IP address (e.g., the IPv6 address), where the first IP address includes a prefix and/or a suffix associated with a first IP version (e.g., IPv6) used by the local network 106 and a second IP address associated with a second IP version (e.g., IPv4). For example, the second IP address may include a well-known IPv4 address, such as, but not limited to, 192.0.0.170 and/or 192.0.0.171 Additionally, in some examples, the local DNS resolver 104 (and/or one or more other local DNS resolvers) may determine one or more additional patterns associated with the first IP version. The local DNS resolver 104 may then generate the answer set 126 that includes the pattern(s) 118. In some examples, the answer set 126 includes an AAAA answer that includes a resource record, where the resource record contains the pattern(s) 118. The local DNS resolver 104 may then send the answer set 126 to the electronic device 102.

At "Step 3," the electronic device 102 may enhance the DNS packet 124 using the answer set 126. For instance, in some examples, the DNS proxy 120 may enhance the DNS packet 124 by at least including the answer set 126 in the DNS packet 124, using one or more of the processes described herein. For example, the DNS proxy 120 may embed the answer set 126 in the OPT_RR portion of the DNS packet 124, or local DNS Resolver 104 may enhance a similar DNS query to public DNS resolver 108 if it needs to do a recursive lookup for a name (this approach removes the need for a DNS proxy). However, in other examples, the DNS proxy 120 may initially analyze the answer set 126 in order to identify the prefix and/or the suffix. For example, the DNS proxy 120 may determine where the well-know IPv4 address starts by performing pattern matching. Once the DNS proxy 120 identifies the well-known IPv4 address, the DNS proxy 120 may determine that anything before the well-known IPv4 address includes the prefix and anything after the well-known IPv4 address includes the suffix. The DNS proxy 120 may then enhance the DNS packet 124 by embedding the prefix and/or the suffix into the DNS packet 124.

At "Step 4," the electronic device 102 may send the DNS packet 124 to the public DNS resolver 108. For instance, after the DNS proxy 120 enhances the DNS packet 124, the DNS proxy 120 may cause the electronic device 102 to send the DNS packet 124 to the public DNS resolver 108.

At "Step 5", the public DNS resolver 108 may generate a synthesized resource record 128 using the DNS packet 124. For example, the public DNS resolver 108 may initially search for a first resource record associated with the first IP version (e.g., an AAAA resource record). In some examples, the public DNS resolver 108 searches for the first resource record using address database(s) 130. Additionally, or alternatively, in some examples, the public DNS resolver 108 searches for the first resource record using one or more external resources (which may also be represented by the resource(s) 110). The public DNS resolver 108 may then analyze the DNS packet 124 to determine that the DNS packet 124 includes the answer set 126 (e.g., determine that the DNS packet 124 is enhanced with the answer set 126). Based on determining that the DNS packet 124 includes the answer set 126 and/or receiving the information indicating that there is the second resource record 132 associated with the second IP version, the public DNS resolver 108 may then search for the second resource record 132 associated with the second IP version. In some examples, the public DNS resolver 108 searches for the second resource record 132 using address database(s) 130. Additionally, or alternatively, in some examples, the public DNS resolver 108 searches for the second resource record 132 using one or more external resources (which may also be represented by the resource(s) 110, and which may include additional DNS resolvers).

Based on performing the search, the public DNS resolver 108 may then receive the second resource record 132. The public DNS resolver 108 then generates the synthesized resource record 128 (e.g., a synthesized AAAA resource record) using the answer set 126 and the second resource record 132. For example, the public DNS resolver 108 may determine where the well-know IPv4 address starts by performing pattern matching. Once the public DNS resolver 108 identifies the well-known IPv4 address, the public DNS resolver 108 may determine that anything before the well-known IPv4 address includes the prefix and anything after the well-known IPv4 address includes the suffix. The public DNS resolver 108 may then generate a synthesized AAAA resource record by adding at least the prefix and/or the suffix associated with the first network to an IPv4 address (which may be represented by 134) contained in the second resource record. While this is just one example technique of how the public DNS resolver 108 may generate the synthesized resource record 128, in other examples, the public DNS resolver 108 may perform additional and/or alternative techniques.

However, in alternative examples where the DNS packet 124 includes the prefix and the suffix, without the entire answer set 126, the public DNS resolver 108 may retrieve the prefix and the suffix from the DNS packet 124. The public DNS resolver 108 may then again generate a synthesized AAAA resource record by adding at least the prefix and/or the suffix associated with the first network to an IPv4 address (which may be represented by 134) contained in the second resource record.

At "Step 6," the public DNS resolver 108 may send the synthesized resource record 128 that includes the synthesized address(es) 134 to the electronic device 102.

As further illustrated in the example of FIG. 1A, the electronic device 102 may include processor(s) 136, network interface(s) 138, and memory 140, the local DNS resolver 104 may include processor(s) 142, network interface(s) 144, and memory 146, and the public DNS resolver 108 may include processor(s) 148, network interface(s) 150, and memory 152. As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory discussed herein may include at least one operating system (OS) component that is configured to manage hardware resource devices such as the network interface(s), the I/O devices of the respective apparatuses, and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

Network Interface(s) may enable communication of data between the devices. The network interface(s) may include one or more network interface controllers (NICs) or other types of transceiver devices to send and receive messages over the network(s). For instance, each of the network interface(s) may include a personal area network (PAN) component to enable messages over one or more short-range wireless message channels. For instance, the PAN component may enable messages compliant with at least one of the following standards IEEE 802.15.4 (ZigBee), IEEE 802.15.1 (Bluetooth), IEEE 802.11 (WiFi), or any other PAN message protocol. Furthermore, each of the network interface(s) may include a wide area network (WAN) component to enable message over a wide area network.

As further illustrated in FIG. 1A, the environment 100 may include a gateway 154, such as a NAT64 Gateway (e.g., a translator). In some examples, the communications being sent from the electronic device 102 to the public DNS resolver 108 and/or from the public DNS resolver 108 to the electronic device 102 may pass through the gateway 154. For example, the electronic device 102 may send the DNS packet 124 to the gateway 154, which then sends the DNS packet 124 to the public DNS resolver 108. Additionally, the public DNS resolver 108 may send the resource record 128 to the gateway 154, which then sends the resource record 128 to the electronic device 102.

Figure 1B:
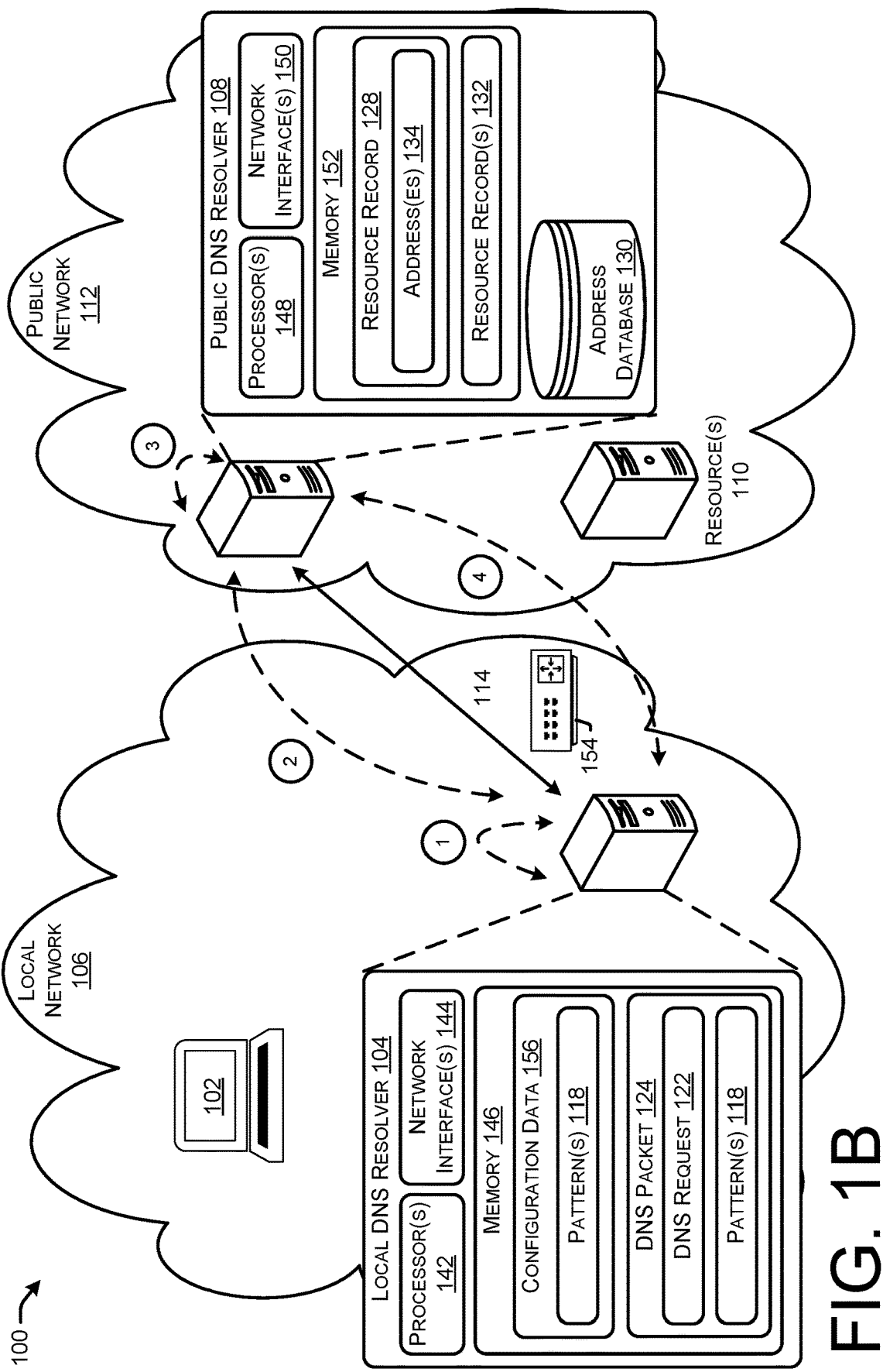
FIG. 1B illustrates another component diagram with the example environment in which Domain Name System support may be provided, in accordance with the present concepts.

FIG. 1B illustrates another component diagram with the example environment in which Domain Name System support may be provided, in accordance with the present concepts. In the example of FIG. 1B, the local DNS resolve 104 enhances the DNS packet 124 and then sends the DNS packet 124, as enhanced, to the public DNS resolver 108. For instance, at "Step 1," the local DNS resolver 104 may enhance the DNS packet 124 using the pattern(s) 118, where the pattern(s) 118 are represented by configuration data 156 (e.g., configured by a network administrator of the local network 106). For instance, in some examples, the local DNS resolver 104 may enhance the DNS packet 124 by at least including the pattern(s) 118 in the DNS packet 124, using one or more of the processes described herein. For example, the local DNS resolver 104 may embed the pattern(s) 118 in the OPT_RR portion of the DNS packet 124.

At "Step 2," the local DNS resolver 104 may send the DNS packet 124 to the public DNS resolver 108. For instance, after the local DNS resolver 104 enhances the DNS packet 124, the local DNS resolver 104 then sends the DNS packet 124 to the public DNS resolver 108.

At "Step 3", the public DNS resolver 108 may generate a synthesized resource record 128 using the DNS packet 124. For example, the public DNS resolver 108 may initially search for a first resource record associated with the first IP version (e.g., an AAAA resource record). In some examples, the public DNS resolver 108 searches for the first resource record using address database(s) 130. Additionally, or alternatively, in some examples, the public DNS resolver 108 searches for the first resource record using one or more external resources (which may also be represented by the resource(s) 110). The public DNS resolver 108 may then analyze the DNS packet 124 to determine that the DNS packet 124 includes the patter 118 (e.g., determine that the DNS packet 124 is enhanced with the pattern(s) 118). Based on determining that the DNS packet 124 includes the pattern(s) 118 and/or receiving the information indicating that there is the second resource record 132 associated with the second IP version, the public DNS resolver 108 may then search for the second resource record 132 associated with the second IP version. In some examples, the public DNS resolver 108 searches for the second resource record 132 using address database(s) 130. Additionally, or alternatively, in some examples, the public DNS resolver 108 searches for the second resource record 132 using one or more external resources (which may also be represented by the resource(s) 110, and which may include additional DNS resolvers).

Based on performing the search, the public DNS resolver 108 may then receive the second resource record 132. The public DNS resolver 108 then generates the synthesized resource record 128 (e.g., a synthesized AAAA resource record) using the pattern(s) 118 and the second resource record 132. For example, the public DNS resolver 108 may generate a synthesized AAAA resource record by adding at least the prefix and/or the suffix associated with the first network to an IPv4 address (which may be represented by 134) contained in the second resource record. While this is just one example technique of how the public DNS resolver 108 may generate the synthesized resource record 128, in other examples, the public DNS resolver 108 may perform additional and/or alternative techniques.

At "Step 4," the public DNS resolver 108 may send the synthesized resource record 128 that includes the synthesized address(es) 134 to the local DNS resolver 104.

As further illustrated in FIG. 1B, the communications being sent from the local DNS resolver 104 to the public DNS resolver 108 and/or from the public DNS resolver 108 to the local DNS resolver 104 may pass through the gateway 154. For example, the local DNS resolver 104 may send the DNS packet 124 to the gateway 154, which then sends the DNS packet 124 to the public DNS resolver 108. Additionally, the public DNS resolver 108 may send the resource record 128 to the gateway 154, which then sends the resource record 128 to the local DNS resolver.

Figure 2:
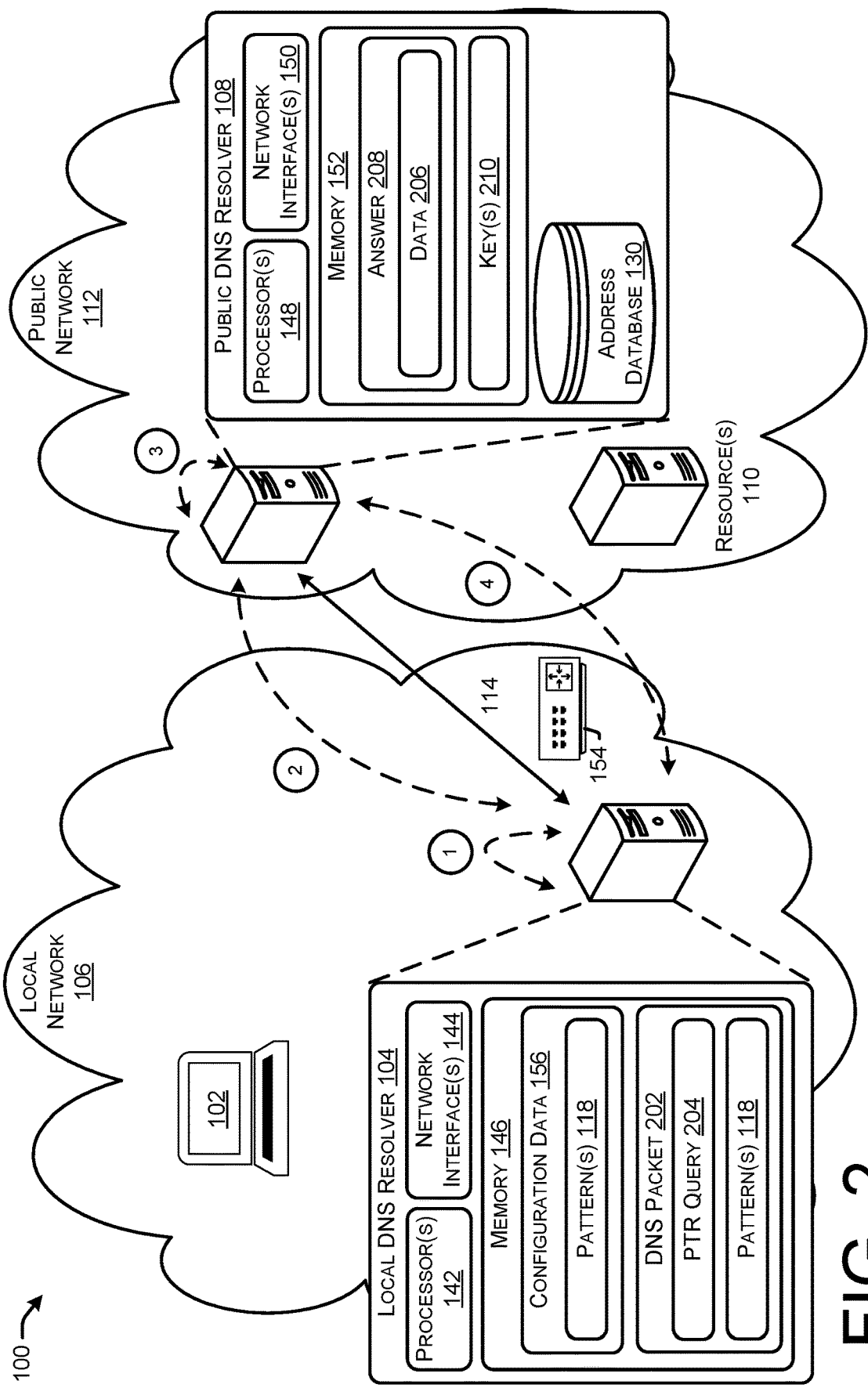
FIG. 2 illustrates a component diagram of the example environment where "reverse lookup" support may be provided, in accordance with the present concepts.

The examples of FIGS. 1A and 1B describe enhancing the DNS packet in order to perform a "forward lookup" for an address associated with a first IP version (e.g., IPv6 address) to a resource associated with a second IP version (e.g., an IPv4 resource). However, in other examples, the devices may perform similar DNS packet enhancing processes in order to perform a "reverse lookup" that maps an address to one or more names. For instance, FIG. 2 illustrates a component diagram of the example environment where "reverse lookup" support may be provided, in accordance with the present concepts.

At "Step 1," the local DNS resolver 104 may generate a DNS packet 202 that includes the pattern(s) 118 (which may be determined using one or more of the processes described herein) and a PTR query 204 for an address associated with the first version (IPv6 address). In some examples, the local DNS resolver 104 may use similar processes as those described above in order to embed the pattern(s) 118 in the DNS packet 202 when enhancing the DNS packet 202. Additionally, while the example of FIG. 2 illustrates the local DNS resolver 104 as generating the DNS packet 202, in other examples, the electronic device 102 may generate the DNS packet 202 using the pattern(s) 118 (e.g., using the answer set 126 from the example of FIG. 1A).

At "Step 2," the local DNS resolver 104 may send the DNS packet 202 to the public DNS resolver 108. For instance, after the local DNS resolver 104 enhances the DNS packet 202, the local DNS resolver 104 then sends the DNS packet 124 to the public DNS resolver 108.

At "Step 3," the public DNS resolver 108 takes the IP address that is included in the PTR query 204 and determines that the IP address does not exist. Based on the determination, the public DSN resolver 108 may then match the IP address to the pattern(s) 118 that are included in the DNS packet 202. Based on the match, the public DNS resolver 108 then extracts an IP address (referred to, in these examples, as a "extracted IP address") from the IP address using the pattern(s) 118. In some examples, the public DNS resolver 108 extracts the extracted IP address by removing at least the prefix and the suffix, associated with the pattern(s) 118, from the IP address. For example, if the IP address includes an IPv6 address, then the public DNS resolver 108 may extract an IPv4 address (e.g., the extracted IP address) from the IPv6 address using the pattern(s) 108.

The public DNS resolver 108 may then perform a search using the extracted IP address in order to identify data 206 (e.g., name(s)) associated with the extract IP address. In some examples, the public DSN resolver 108 identifies the data 206 through a different DNS resolver using the extracted IP address. Additionally, or alternatively, in some examples, the public DSN resolver 108 identifies the data 206 by performing a lookup, using the extracted IP address, in existing cached data. In either of the examples, the public DNS resolver 108 may then generated an answer 208 that includes the data 206. In some examples, such as when the public DNS resolver 108 includes an authoritative DNS resolver, the public DNS resolver 108 may also digitally sign the answer 208 using a key 210 (e.g., a private key). This way, the answer 208 may be verified, such as by using DNSSEC protocols.

Finally, at "Step 4," the public DNS resolver 108 sends the answer 208 back to the local DNS resolver 104.

As further illustrated in FIG. 2, the communications being sent from the local DNS resolver 104 to the public DNS resolver 108 and/or from the public DNS resolver 108 to the local DNS resolver 104 may pass through the gateway 154. For example, the local DNS resolver 104 may send the DNS packet 202 to the gateway 154, which then sends the DNS packet 202 to the public DNS resolver 108. Additionally, the public DNS resolver 108 may send the answer 208 to the gateway 154, which then sends the answer 208 to the local DNS resolver.

Figure 3:
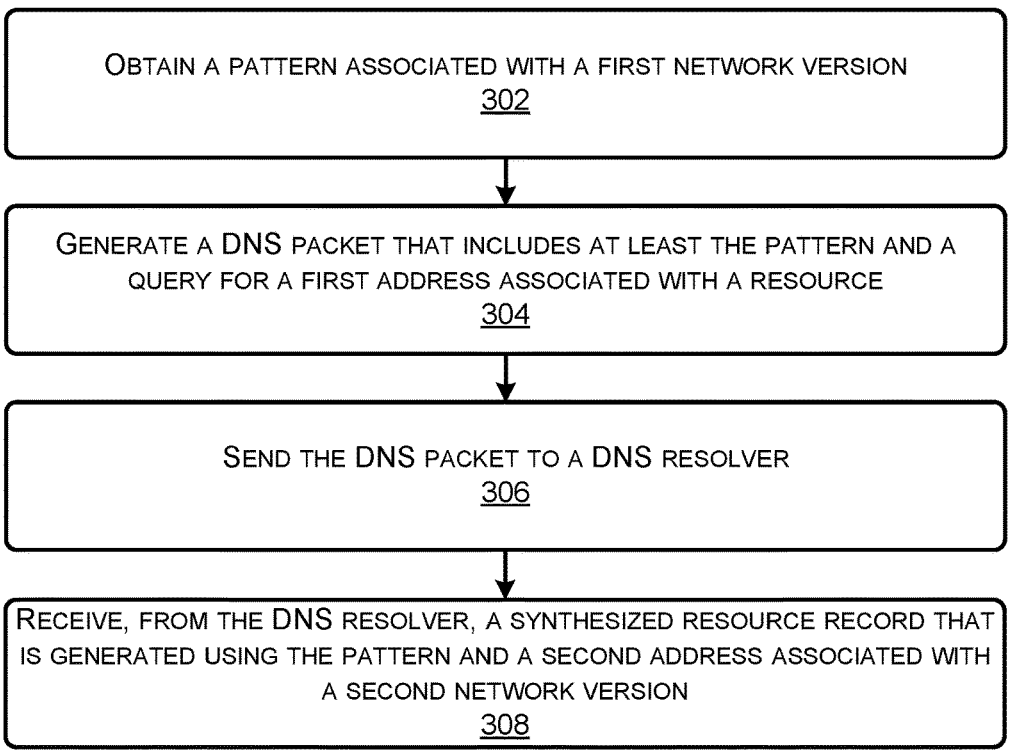
FIG. 3 illustrates a flow diagram of an example process of an electronic device enhancing a Domain Name System packet, in accordance with the present concepts.

FIG. 3 illustrates a flow diagram of an example process 300 of a device enhancing a Domain Name System packet, in accordance with the present concepts. An operation 302 represents obtaining a pattern associated with a first network version. For instance, a device (e.g., the electronic device 102, the local DNS resolver 104, the public DNS resolver 108, etc.) may obtain the pattern(s). In some examples, to obtain the pattern(s), the device may send, to a local DNS resolver, a query for an address for a name associated with the first network version (e.g., IPv6). As such, in some examples, the query includes a DNS query for the IPv6 address of the name ipv4only.arpa. The device may then receive an answer set that includes the pattern(s) from the local DNS resolver. Additionally, or alternatively, in some examples, to obtain the pattern(s), the device may be configured with the pattern(s). While these are just a couple example techniques of how the device may obtain the pattern(s), in other examples, the device may obtain the pattern(s) using additional and/or alternative techniques.

An operation 304 represents generating a DNS packet that includes at least the pattern and a query for a first address associated with a resource. For instance, in some examples, the device may generate the DNS packet to include at least the pattern(s) and the first query for the first address associated with first network version. In some examples, the device may generate the DNS packet by embedding the pattern(s) in the OPT_RR portion of the DNS packet. In some examples, a new IANA code may be registered and/or created, where the device embeds the pattern(s) using the new IANA code. In some examples, the device embeds the pattern(s) using existing code associated with the OPT_RR portion of the DNS packet.

An operation 306 represents sending the DNS packet to a DNS resolver and an operation 308 represents receiving, from the DNS resolver, a synthesized resource record that is generated using the pattern(s) and a second address associated with a second network version. For instance, the device may send the DNS packet to the DNS resolver (e.g., a public DNS resolver). Based on sending the DNS packet to the DNS resolver, the device may receive the synthesized resource record from the DNS resolver. As described herein, the DNS resolver may generate the synthesized resource record by at least adding the prefix and/or the suffix, from the pattern(s), to the second address associated with the second IP version (e.g., an IPv4 address) contained in a resource record.

Figure 4:
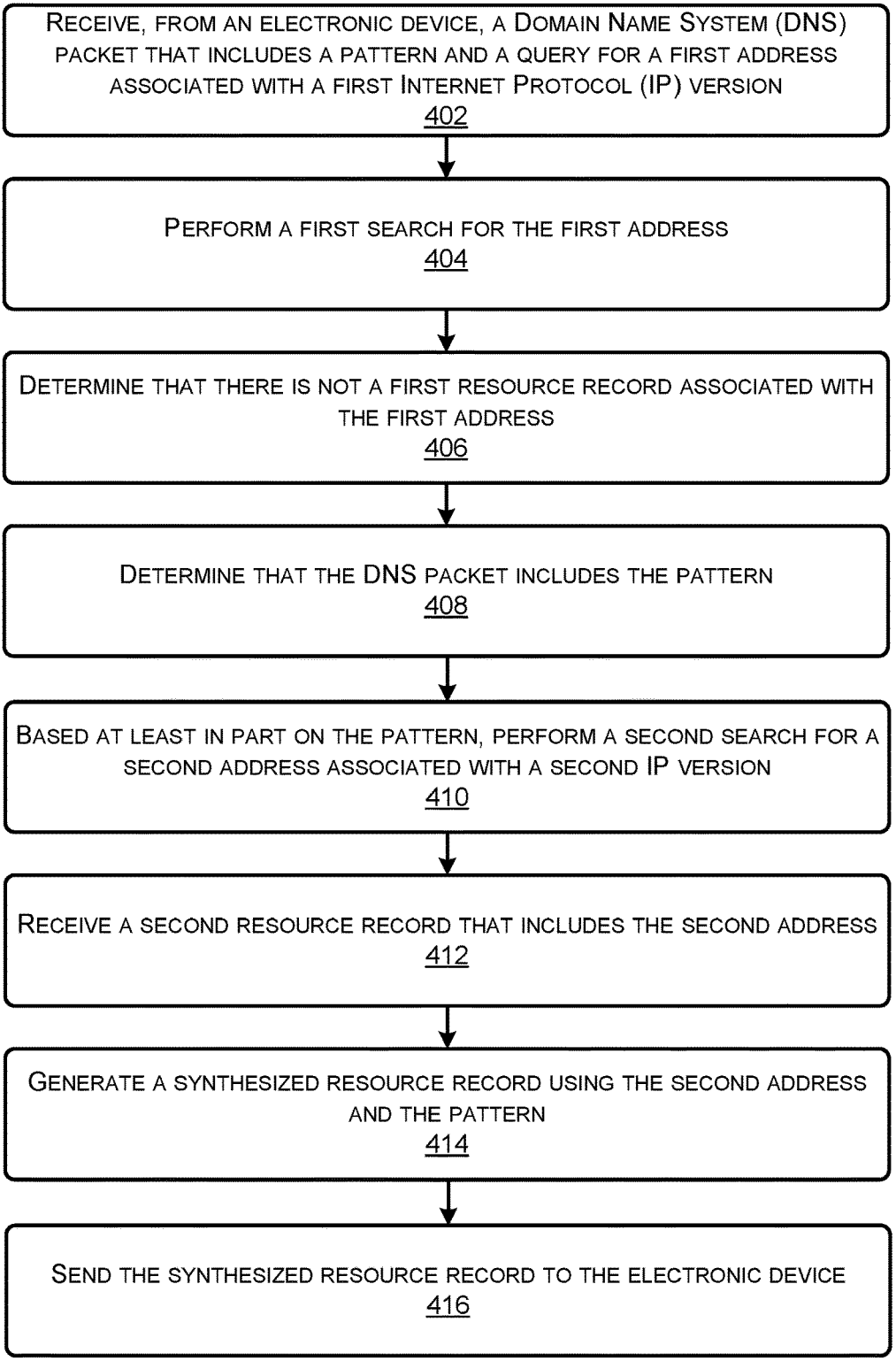
FIG. 4 illustrates a flow diagram of an example process of a Domain Name System (DNS) resolver generating a synthesized resource record using an answer from a DNS packet, in accordance with the present concepts.

FIG. 4 illustrates a flow diagram of an example process 400 of a DNS resolver generating a synthesized resource record using an answer from a DNS packet, in accordance with the present concepts. An operation 402 represents receiving, from an electronic device, a Domain Name System (DNS) packet that includes a pattern and a query for a first address associated with a first Internet Protocol (IP) version. For instance, the DNS resolver may receive the DNS packet from the electronic device (e.g., the electronic device 102, the local DNS resolver 104, the public DNS resolver 108, etc.). In some instances, such as when the first IP version includes IPv6, the query includes a question for an AAAA record. Additionally, the DNS packet may include an set that includes an IPv6 address, where the IPv6 address includes a prefix, a well-know IPv4 address, and a suffix.

An operation 404 represents performing a first search for the first address and an operation 406 represents determining that there is not a first resource record associated with the first address. For instance, based on receiving the DNS packet, the DNS resolver may perform the first search for the first resource record associated with the first address (e.g., searches for an IPv6 answer for the name request by the AAAA question). In some examples, the DNS resolver searches for the first resource record using local address database(s). Additionally, or alternatively, in some examples, the DNS resolver searches for the first resource record using one or more external resources. In either of the examples, based on the first search, the DNS resolver may determine that the first resource record associated with the first address does not exist. This may be because the resource associated with the name is part of a network that uses a second IP version that is different than the first IP version.

An operation 408 represents determining that the DNS packet includes the pattern. For instance, the DNS resolver may analyze the DNS packet and, based on the analysis, determine that the DNS packet includes the pattern(s). In some examples, the DNS resolver analyzes the DNS packet before performing the first search. In some examples, the DNS resolver analyzes the DNS packet after determining that the first resource record does not exist.

An operation 410 represents, based at least in part on the pattern, performing a second search for a second address associated with a second IP version and an operation 412 represents receiving a second resource record that includes the second address. For instance, based on determining that the DNS packet includes the pattern(s), the DNS resolver may determine to perform the second search. In some examples, the second IP version includes IPv4 (e.g., the second search is for an IPv4 address associated with the name in the request). In some examples, the DNS resolver searches for the second resource record using the local address database(s). Additionally, or alternatively, in some examples, the DNS resolver searches for the second resource record using one or more external resources. In either of the examples, based on the second search, the DNS resolver may receive the second resource record associated with the second address.

An operation 414 represents generating a synthesized resource record using the second address and the pattern. For instance, the DNS resolver may generate the synthesized resource record using at least the second address and the pattern(s). As described herein, in some examples, to generate the synthesized resource record, the DNS resolver may add at least the prefix and/or the suffix, from the pattern(s), to the second address record.

An operation 416 represents sending the synthesized resource record to the electronic device. For instance, after generating the synthesized resource record, the DNS resolver may send the synthesized resource record to the electronic device.

Figure 5:
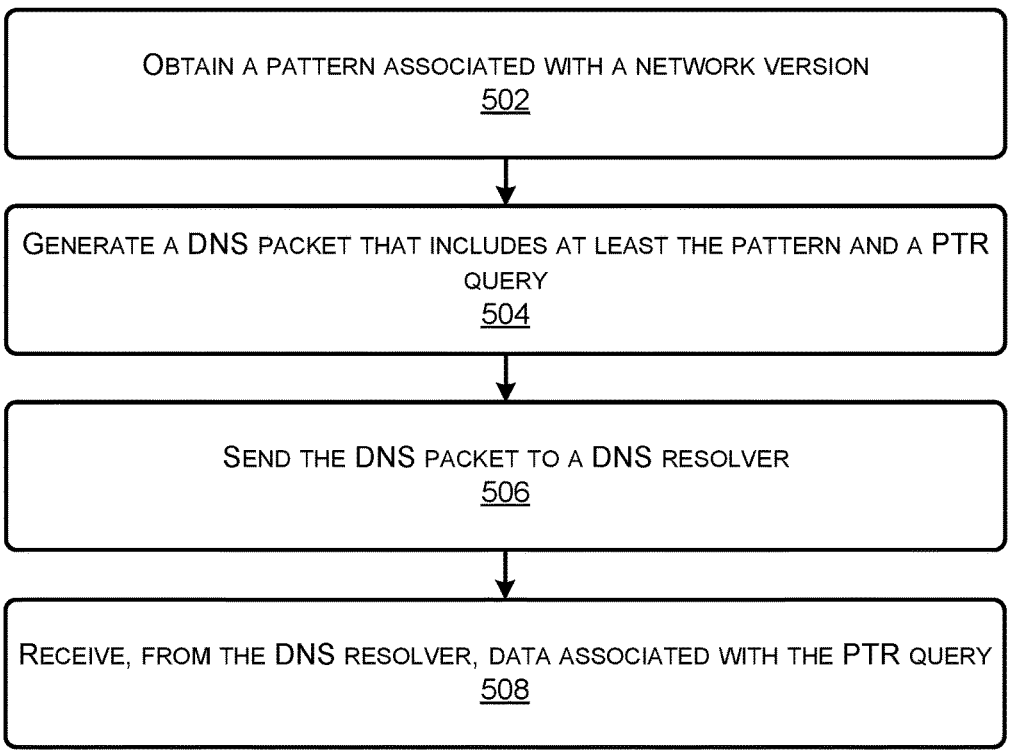
FIG. 5 illustrates a flow diagram of an example process of an electronic device enhancing a Domain Name System packet for reverse lookup, in accordance with the present concepts.

FIG. 5 illustrates a flow diagram of an example process 500 of an electronic device enhancing a Domain Name System packet for reverse lookup, in accordance with the present concepts. An operation 502 represents obtaining a pattern associated with a network version. For instance, a device (e.g., the electronic device 102, the local DNS resolver 104, the public DNS resolver 108, etc.) may obtain the pattern(s). In some examples, to obtain the pattern(s), the device may send, to a local DNS resolver, a query for an address for a name associated with the network version (e.g., IPv6). As such, in some examples, the query includes a DNS query for the IPv6 address of the name ipv4only.arpa. The device may then receive an answer set that includes the pattern(s) from the local DNS resolver. Additionally, or alternatively, in some examples, to obtain the pattern(s), the device may be configured with the pattern(s). While these are just a couple example techniques of how the device may obtain the pattern(s), in other examples, the device may obtain the pattern(s) using additional and/or alternative techniques.

An operation 504 represents generating a DNS packet that includes at least the pattern and a PTR query. For instance, in some examples, the device may generate the DNS packet to include at least the pattern(s) and the PTR query. In some examples, the device may generate the DNS packet by embedding the pattern(s) in the OPT_RR portion of the DNS packet. In some examples, a new IANA code may be registered and/or created, where the device embeds the pattern(s) using the new IANA code. In some examples, the device embeds the pattern(s) using existing code associated with the OPT_RR portion of the DNS packet.

An operation 506 represents sending the DNS packet to a DNS resolver and an operation 508 represents receiving, from the DNS resolver, data associated with the PTR query. For instance, the device may send the DNS packet to the DNS resolver (e.g., a public DNS resolver). Based on sending the DNS packet to the DNS resolver, the device may receive the data from the DNS resolver. As described herein, the DNS resolver may retrieve the data using the PTR query and the patter (e.g., the prefix and/or the suffix). Additionally, the data may represent name(s) associated with the PTR query.

Figure 6:
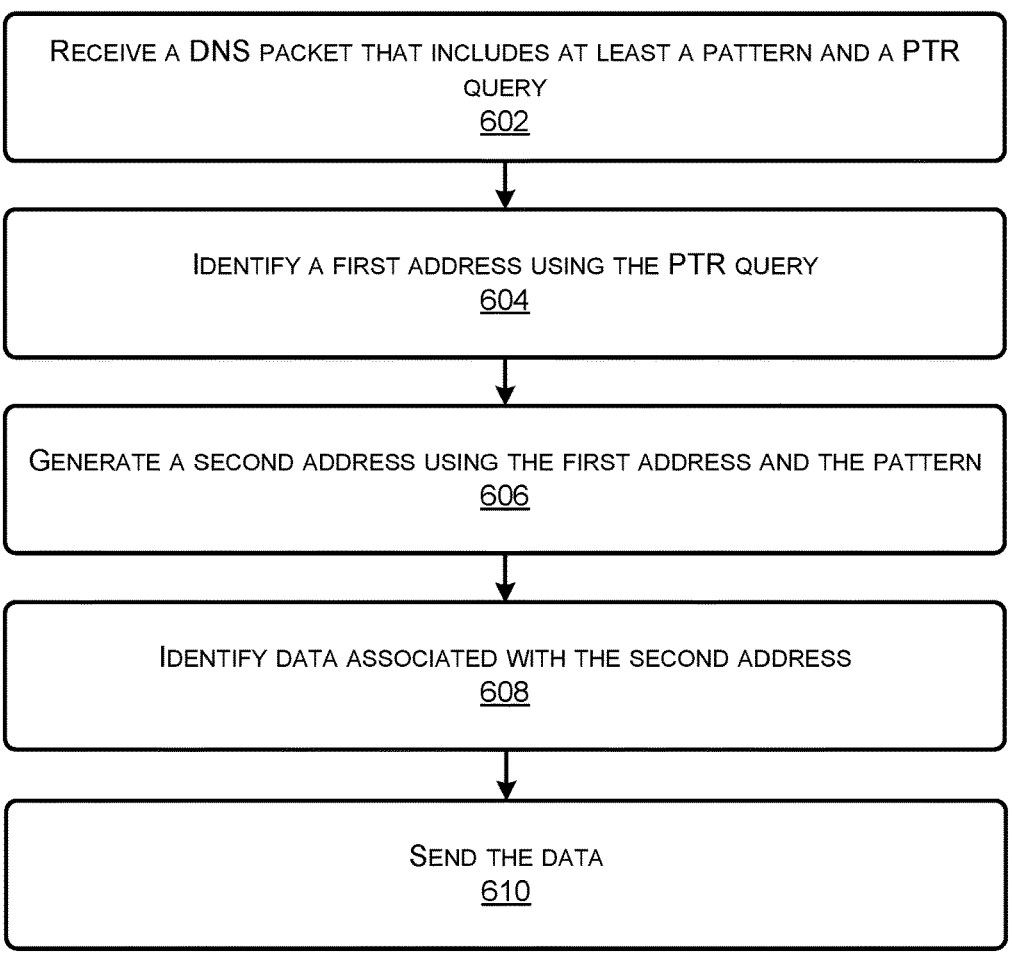
FIG. 6 illustrates a flow diagram of an example process of a Domain Name System (DNS) resolver using an enhanced DNS packet for reverse lookup, in accordance with the present concepts.

FIG. 6 illustrates a flow diagram of an example process 600 of a Domain Name System (DNS) resolver using an enhanced DNS packet for reverse lookup, in accordance with the present concepts. An operation 602 represents receiving a DNS packet that includes at least a pattern and a PTR query. For instance, the DNS resolver may receive the DNS packet from a device, such as another DNS resolver, an electronic device, and/or the like. The DNS packet may include the PTR query and also be enhanced with the pattern(s).

An operation 604 represents identifying a first address associated with the PTR query and an operation 606 represents generating a second address using the first address and the pattern(s). For instance, the DNS resolver may identify the first address using the PTR query. As described herein, the first address may include an IPv6 address. In some examples, the DNS resolver may then determine that the first address does not exist. As such, the DNS resolver may generate the second address using the first address and the pattern(s). As described herein, the second address may include an IPv4 address. For example, the DNS resolver may match the IPv6 address to the pattern(s). Based on the match, the DNS resolver may extract the IPv4 address from the IPv6 address using the pattern(s). In some examples, the DNS resolver extracts the IPv4 address by removing at least the prefix and the suffix, associated with the pattern(s), from the IPv6 address.

An operation 608 represents identifying data associated with the second address and an operation 610 represents sending the data. For instance, the DNS resolver may then perform a search using the second address in order to identify the data. As described herein, the data may represent name(s)) associated with the second address. In some examples, the DSN resolver identifies the data through a different DNS resolver using the second address. Additionally, or alternatively, in some examples, the DSN resolver identifies the data by performing a lookup, using the second address, in existing cached data. In either of the examples, the DNS resolver may then send, to the device, an answer that includes the data.

Figure 7:
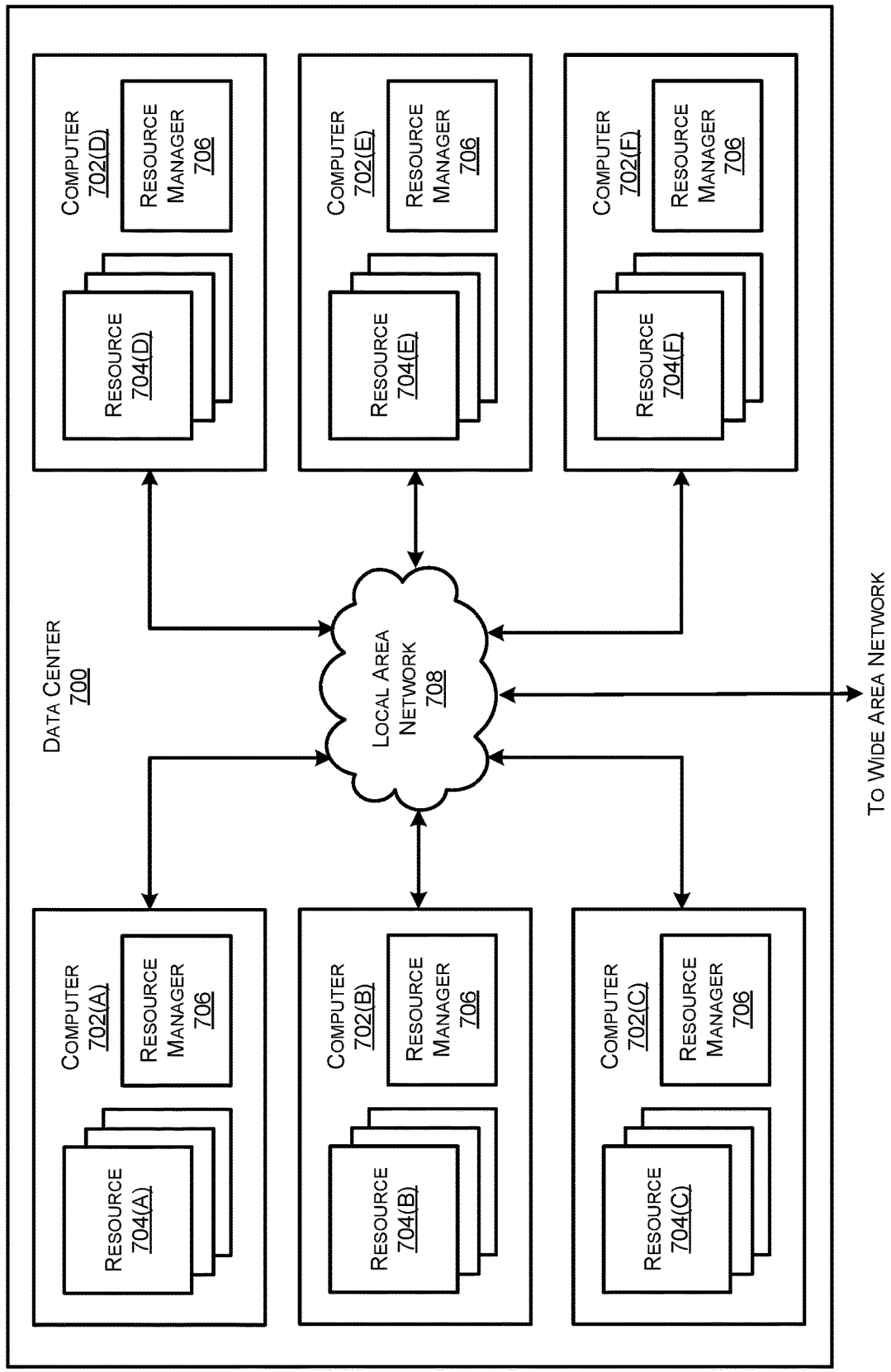
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several computers 702A-702F (which might be referred to herein singularly as "a computer 702" or in the plural as "the computers 702") for providing computing resources. In some examples, the resources and/or computers 702 may include, or correspond to, any type of networked device described herein, such as the local DNS resolver 104 and/or the public DNS resolver 108. Although, computers 702 may comprise any type of networked device, such as servers, switches, routers, hubs, bridges, gateways, modems, repeaters, access points, hosts, etc.

The computers 702 can be standard tower, rack-mount, or blade server computers configured appropriately for providing computing resources. In some examples, the computers 702 may provide computing resources 704 including data processing resources such as virtual machine (VM) instances or hardware computing systems, database clusters, computing clusters, storage clusters, data storage resources, database resources, networking resources, and others. Some of the computers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single computer 702. Computers 702 in the data center 700 can also be configured to provide network services and other types of services.

In the example data center 700 shown in FIG. 7, an appropriate local area network (LAN) 708 is also utilized to interconnect the computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the computers 702A-702F in each data center 700, and, potentially, between computing resources in each of the computers 702. It should be merely illustrative and that other implementations can be utilized.

In some examples, the computers 702 may each execute one or more application containers and/or virtual machines to perform techniques described herein. For instance, the containers and/or virtual machines may serve as server devices, user devices, and/or routers in the cloud computing network.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
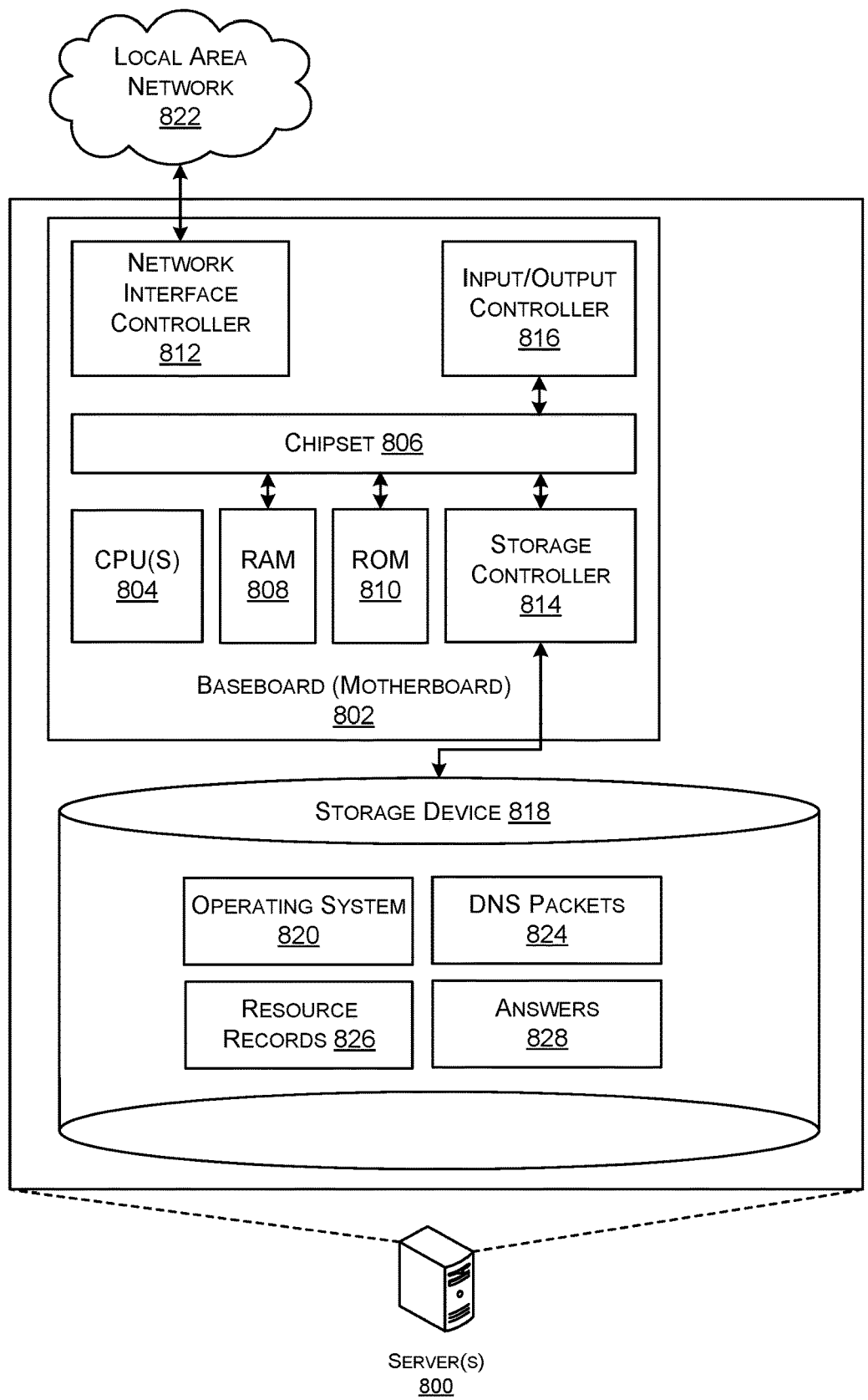
FIG. 8 is a computer architecture diagram showing an illustrative computer hardware architecture for implementing a server computing device that can be utilized to implement aspects of the various technologies presented herein.

FIG. 8 is a computer architecture diagram showing an illustrative computer hardware architecture for implementing a server computing device 800 that can be utilized to implement aspects of the various technologies presented herein. The electronic device 102, the local DNS resolver 104 and/or the public DNS resolver 108 discussed above, may include some or all of the components discussed below with reference to the server computing device 800.

To begin, the server computer 800 can be standard tower, rack-mount, or blade server computers configured appropriately for providing the computing resources described herein. As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the servers 800 can also be configured to execute a resource manager capable of instantiating and/or managing the computing resources. In the case of VM instances, for example, the resource manager can be a hypervisor or another type of program configured to enable the execution of multiple VM instances on a single server computer 800. Server computers 800 in a data center can also be configured to provide network services and other types of services.

The server computer 800 includes a baseboard 802, or "motherboard," which is a printed circuit board to which a multitude of components or devices can be connected by way of a system bus or other electrical communication paths. In one illustrative configuration, one or more central processing units (CPUs) 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 800. The chipset 806 can further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network, such as a local area network 822. The chipset 806 can include functionality for providing network connectivity through a Network Interface Card (NIC) 812, such as a gigabit Ethernet adapter. The NIC 812 is capable of connecting the computer 800 to other computing devices over the network. It should be appreciated that multiple NICs 812 can be present in the computer 800, connecting the computer to other types of networks and remote computer systems.

The computer 800 can be connected to a storage device 818 that provides non-volatile storage for the computer. The storage device 818 can store an operating system 820 and data, which have been described in greater detail herein. The storage device 818 can be connected to the computer 800 through a storage controller 814 connected to the chipset 806. The storage device 818 can consist of one or more physical storage units. The storage controller 814 can interface with the physical storage units through a serial attached SCSI (SAS) interface, a serial advanced technology attachment (SATA) interface, an FC interface, or other type of interface for physically connecting and transferring data between computers and physical storage units.

The computer 800 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 800 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 818 by detecting the physical states or characteristics of one or more particular locations within the physical storage units.

In addition to the mass storage device 818 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800. In some examples, the operations performed by the computer 800, and or any components included therein, may be supported by one or more devices similar to computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 800. According to one embodiment, the operating system comprises the LINUX operating system. According to another embodiment, the operating system comprises the WINDOWS® SERVER operating system from MICROSOFT Corporation of Redmond, Washington According to further embodiments, the operating system can comprise the UNIX operating system or one of its variants. It should be appreciated that other operating systems can also be utilized. The storage device 818 can store other system or application programs and data utilized by the computer 800.

In one embodiment, the storage device 818 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 3 and 4. The computer 800 can also include computer-readable storage media having instructions stored thereupon for performing any of the other computer-implemented operations described herein.

The computer 800 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

As further illustrated in the example of FIG. 8, the computer 800 may store DNS packets 624, resource records 826, and answers 828. The DNS packets 624 may represent, and/or include, the DNS packet 124 and/or the DNS packet 202. Additionally, the resource records 826 may represent, and/or include, the synthesized resource record 128 and/or the resource record(s) 132. Furthermore, the answers 828 may represent, and/or include, the answer set 126.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. An electronic device comprising:
wherein the electronic device is operably coupled to a local network and a public Domain Name System (DNS) resolver and is configured to:
determine a pattern associated with an IPv6 address of the local network wherein the pattern is usable by the local network to identify a mapped IPv4 external address;
send a request for an IPv6 address to the local network wherein the IPV6 address is based upon a set of IPv4 addresses mapped into IPv6 addresses using at least one pattern of a set of patterns cached at the local network;
responsive to the request that the IPv6 address is not available at the local network, generate a DNS packet that at least comprises the pattern associated with an IPv6 address of the local network;
send another request comprising a query based on the DNS packet to the public DNS resolver for the IPv6 address wherein the IPv6 address being associated with a resource having an IPv4 address; and
responsive to the query, receive an answer generated by the public DNS resolver based on the pattern from the DNS packet and the IPv6 address which is associated with the resource having an IPv4 address.

2. The electronic device as recited in claim 1, wherein the pattern associated with an IPv6 address of the local network comprises a network-specific prefix.

3. The electronic device as recited in claim 1, wherein the answer generated by the public DNS resolver comprises a synthesized IPv6 address.

4. The electronic device as recited in claim 3, wherein the synthesized IPv6 address comprises at least the local network pattern and the IPv4 address of the resource.

5. The electronic device as recited in claim 1, wherein the electronic device is further configured to embed a network-specific prefix of the DNS packet into a record associated with the resource.

6. The electronic device as recited in claim 5, wherein the resource record comprises at least a synthesized response record for the resource, the synthesized response record being associated with the IPv4 address.

7. The electronic device as recited in claim 1, wherein the electronic device is further configured to store configuration data that represents the pattern, and wherein the DNS packet being generated based in part on the configuration data.

8. The electronic device as recited in claim 1, wherein the pattern comprises at least a prefix and a suffix, the prefix and the suffix being associated with the local network.

9. A method comprising:
determining, by an electronic device, a pattern associated with an IPv6 address of a local network wherein the pattern is usable by the local network to identify a mapped IPv4 external address;
sending, by the electronic device, a request for an IPv6 address to the local network wherein the IPv6 address is based upon a set of IPv4 addresses mapped into IPv6 addresses using at least one pattern of a set of patterns cached at the local network;
generating, by the electronic device, a Domain Name System (DNS) packet that at least comprises the pattern associated with an IPv6 address of the local network in response to an unavailability of the IPv6 address at the local network;
sending, by the electronic device, another request comprising a query based on the DNS packet to a public DNS resolver for the IPv6 address wherein the IPv6 address being associated with a resource having an IPv4 address; and
receiving, by the electronic device, an answer from the public DNS resolver based on the pattern from the DNS packet and the IPv6 address being associated with the resource having an IPv4 address.

10. The method of claim 9, wherein the pattern associated with an IPv6 address of the local network comprises a network-specific prefix.

11. The method of claim 10, wherein the answer generated by the public DNS resolver comprises a synthesized IPv6 address.

12. The method of claim 11, wherein the synthesized IPv6 address comprises at least the local network pattern and the IPv4 address of the resource.

13. The method of claim 9, further comprising: embedding, by the electronic device, a network-specific prefix of the DNS packet into a record associated with the resource.

14. The method of claim 13, wherein the resource record comprises at least a synthesized response record for the resource, the synthesized response record being associated with the IPv4 address.

15. The method of claim 9, further comprising: storing, by the electronic device, configuration data representing the pattern, and wherein the DNS packet being generated based in part on the configuration data.

16. The method of claim 9, wherein the pattern comprises at least a prefix and a suffix, the prefix and the suffix being associated with the local network.

17. A system comprising:
one or more processors; and
one or more computer-readable media storing instructions that, when executed by the one or more processors, cause the one or more processors to perform operations comprising:
determining a pattern associated with an IPv6 address of a local network wherein the pattern is usable by the local network to identify a mapped IPv4 external address;
sending a request for an IPv6 address to the local network wherein the IPv6 address is based upon a set of IPv4 addresses mapped into IPv6 addresses using at least one pattern of a set of patterns cached at the local network;
generating a Domain Name System (DNS) packet that at least comprises the pattern associated with an IPv6 address of the local network in response to an unavailability of the IPv6 address at the local network;
sending another request comprising a query based on the DNS packet to a public DNS resolver for the IPv6 address; and
receiving an answer from the public DNS resolver based on the pattern from the DNS packet and the IPv6 address wherein the IPv6 address being associated with a resource having an IPv4 address.

18. The system of claim 17, wherein the pattern associated with an IPv6 address of the local network comprises a network-specific prefix.

19. The system of claim 17, wherein the answer generated by the public DNS resolver comprises a synthetic IPv6 address.

20. The system of claim 17, the operations further comprising:
  embedding a network-specific prefix of the DNS packet into a record associated with the resource.

21. The system of claim 17, the operations further comprising: storing configuration data representing the pattern, and wherein the DNS packet being generated based in part on the configuration data.

* * * * *